(12) United States Patent
Jaeger et al.

(10) Patent No.: US 12,277,380 B2
(45) Date of Patent: Apr. 15, 2025

(54) ADAPTIVE STRUCTURED USER INTERFACE

(71) Applicant: Google LLC, Mountain View, CA (US)

(72) Inventors: Timothy Edward Jaeger, Bloomfield, NJ (US); Catherine Goings Lin, Irvine, CA (US); Bert Bräutigam, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/009,918

(22) PCT Filed: Jun. 1, 2022

(86) PCT No.: PCT/US2022/031698
§ 371 (c)(1),
(2) Date: Dec. 12, 2022

(87) PCT Pub. No.: WO2023/234936
PCT Pub. Date: Dec. 7, 2023

(65) Prior Publication Data
US 2024/0249066 A1 Jul. 25, 2024

(51) Int. Cl.
*G06F 40/106* (2020.01)
*G06F 3/14* (2006.01)
*G06F 40/166* (2020.01)

(52) U.S. Cl.
CPC .............. *G06F 40/106* (2020.01); *G06F 3/14* (2013.01); *G06F 40/166* (2020.01)

(58) Field of Classification Search
None
See application file for complete search history.

(56) References Cited

U.S. PATENT DOCUMENTS

| | | | |
|---|---|---|---|
| 10,897,637 B1* | 1/2021 | Pham | H04N 21/23406 |
| 2008/0127174 A1* | 5/2008 | Johnson | G06F 8/658 |
| | | | 717/174 |
| 2017/0163411 A1* | 6/2017 | Van Den Berghe | H04L 47/562 |
| 2018/0039610 A1* | 2/2018 | Litvak | G06F 40/274 |
| 2021/0110288 A1* | 4/2021 | Poothiyot | G06F 8/20 |
| 2021/0334320 A1 | 10/2021 | Faust et al. | |
| 2021/0383252 A1 | 12/2021 | Arnold et al. | |

OTHER PUBLICATIONS

International Search Report and Written Opinion for PCT/US2022/031698, mailing date Jan. 19, 2023, 13 pages.

* cited by examiner

*Primary Examiner* — Tuan S Nguyen
(74) *Attorney, Agent, or Firm* — DORITY & MANNING P.A.

(57) ABSTRACT

Systems and method for the structure, configuration, or arrangement of the input fields in a user interface. For example, a computer-implemented method includes displaying a structured input interface configured with a plurality of input fields. The structured input interface can be configured for rendering in a graphical user interface. A first input field can correspond to an initial notification element in the graphical user interface for rendering in association with the first input field. The method includes receiving user data. The method includes determining, based on the user data, an updated notification element for rendering in association with the first input field. The method includes updating the structured input interface comprising the first input field and the updated notification element.

19 Claims, 7 Drawing Sheets

ADAPTIVE STRUCTURED USER INTERFACE

PRIORITY CLAIM

This application is based upon and claims the right of priority under 35 U.S.C. § 371 to International Application No. PCT/US2022/031698 filed on Jun. 1, 2022, which is incorporated by reference herein.

FIELD

The present disclosure relates generally to systems and methods for updating an adaptive structured user interface. More particularly, the present disclosure relates to adapting the structure, configuration, or arrangement of the input fields in a user interface.

BACKGROUND

Computing devices can perform many tasks and provide various functionality. Accessing such functionality often involves interaction with the computing device(s) through an input interface. Interfaces can include indicators that label required fields for users associated with input fields.

SUMMARY

Aspects and advantages of embodiments of the present disclosure will be set forth in part in the following description, or may be learned from the description, or may be learned through practice of the embodiments.

One aspect of the present disclosure is directed to a computing system. The computing system includes one or more processors and one or more tangible computer readable media that store instructions that are executable by the one or more processors to cause the computing system to perform operations. The tangible computer readable media can be non-transitory. The operations can include displaying, on a first user device, a structured input interface configured with a plurality of input fields. The structured input interface can be configured for rendering in a graphical user interface. A first input field can correspond to an initial notification element in the graphical user interface for rendering in association with the first input field. The operations include receiving, from the first user device, user data. The operations include determining, based on the user data, an updated notification element for rendering in association with the first input field. The operations include updating the structured input interface comprising the first input field and the updated notification element.

Another example aspect of the present disclosure is directed to a computer-implemented method. The method includes displaying, on a first user device, a structured input interface configured with a plurality of input fields. The structured input interface can be configured for rendering in a graphical user interface. A first input field can correspond to an initial notification element in the graphical user interface for rendering in association with the first input field. The method includes receiving, from the first user device, user data. The method includes determining, based on the user data, an updated notification element for rendering in association with the first input field. The method includes updating the structured input interface comprising the first input field and the updated notification element.

Yet another example aspect of the present disclosure is directed to one or more computer readable media storing instructions that are executable by one or more processors to perform operations. The computer readable media can be non-transitory. The operations can include displaying, on a first user device, a structured input interface configured with a plurality of input fields. The structured input interface can be configured for rendering in a graphical user interface. A first input field can correspond to an initial notification element in the graphical user interface for rendering in association with the first input field. The operations include receiving, from the first user device, user data. The operations include determining, based on the user data, an updated notification element for rendering in association with the first input field. The operations include updating the structured input interface comprising the first input field and the updated notification element.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
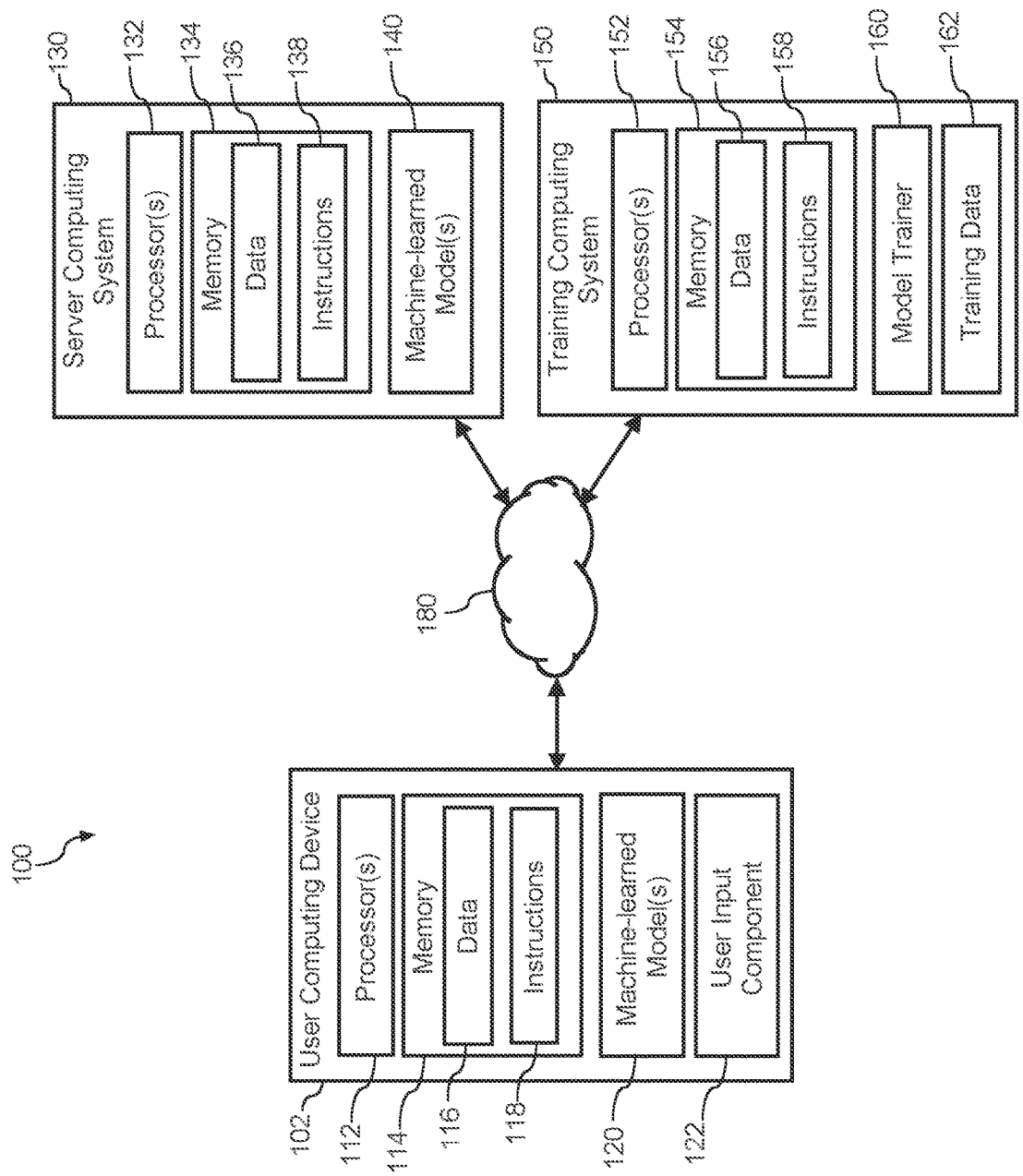
FIG. 1 depicts a block diagram of an example system for generating an adaptive structured user interface.

Generally, the present disclosure is directed to systems and methods for updating an adaptive structured user interface. For example, in some embodiments, a user interface can display a variety of input fields. In some examples, the input fields can be associated with a process flow (e.g., for creating a content item, creating a user account, signing up for a service, etc.). By contextually adapting the structure, configuration, or arrangement of the input fields, aspects of the present disclosure can provide for improving the quality (e.g., reducing errors) and completeness of data obtained from inputs to the input interface.

For example, in some embodiments, an example system can determine an initial notification element for rendering in association with a particular input field. For example, an input field can be a required input field, and the initial notification element can indicate that the field is required (e.g., with color, emphasis, text, symbols, etc.). In some examples, the initial notification element can include a suggestion for an input into the input field or context for how the input data will be used.

In some implementations, the system can determine an updated notification element. For example, the updated notification element can be an inactive state for rendering the input field without additional elements. For example, based on data indicative of prior successful input completions, the system can determine to update the notification element to the inactive state. Additionally, or alternatively, based on data indicative of prior unsuccessful input completions, the system can determine to update the notification element to an active state (e.g., from an inactive state to an active state, from an active state to a different active state, etc.).

In some embodiments, the system can determine the initial or the updated notification element based on an output from a machine-learned model. For instance, a machine-learned model can be trained to generate notification elements (or characteristics thereof) based on historical input metrics (e.g., completion rates, error rates, etc.). The machine-learned model can include generative language models or other machine-learned models for generating notification elements.

Example embodiments according to aspects of the present disclosure can provide a number of technical effects and benefits. For instance, aspects of the described technology can allow for more efficient allocation of computing resources by reconfiguring a structured input interface to increase an input completion rate and decrease an input error rate. For example, in some embodiments structured input interfaces can be automatically reconfigured using machine-learned models to adapt structured input interfaces in real time to improve completion and reduce errors. This can help reduce the computational processing and bandwidth usage by decreasing transmission of error notifications, transmission of incomplete input data structures, and futile processing of incomplete inputs. Example embodiments can also lead to additional computing efficiencies by automatically providing input elements for triggering automated process flows in subsequent processing steps. Providing improved access to such automated process flows using inputs on the user interface can result in a more efficient utilization of processing resources.

With reference now to the Figures, example embodiments of the present disclosure will be discussed in further detail.

Example Devices and Systems

FIG. 1 depicts a block diagram of an example computing system 100 that updates an adaptive structured user interface according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more computer-readable storage media which may be non-transitory, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 2 and 3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel updated notification elements across multiple instances of user input data obtained via a structured user interface).

More particularly, the machine learned model can obtain user input data. The user input data can be associated with a current user session and/or include historical user data. For example, data associated with a current user session can be data obtained in real-time via the structured interface. Historical user data can include data associated with a user account, user characteristics, prior completion data, input error rate, etc. The machine-learned model can receive notification elements as output from the machine-learned model. The notification elements can be an active state or inactive state and can be associated with respective input fields of the structured user interface. The system can provide an updated structured interface comprising the input fields and the respective notification elements.

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a content development service, a campaign management service, a content strategy management service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more computer-readable storage media which may be non-transitory, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2 and 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more computer-readable storage media which may be non-transitory, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices (e.g., the server computing system 130).

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, historical user data. Historical user data can include data associated with a user device (e.g., device identifier). In addition, or alternatively, historical user data can include data associated with a user identifier. In some embodiments, historical user data can include aggregate data associated with a plurality of user identifiers. In some embodiments, the training data 162 can include session data (e.g., of one or more input sessions) associated with one or more input devices, such as session data indexed over a type of input interface or device (e.g., mobile device with touchscreen, mobile device with keyboard, large touchscreen, small touchscreen, large touchscreen, voice inputs, or combinations thereof, etc.). In some embodiments, the training data 162 can include session data not associated with user identifiers.

In some examples, historical user data can include data associated with one or more previous campaigns associated with a user identifier. Data associated with one or more previous campaigns can include a completion rate, an error rate, and/or metrics associated with the performance of a campaign (e.g., content strategy). A completion rate can include a number of successful completions of a particular input field out of a total number of inputs in the particular input field. An error rate can be determined based on a number of errors of entry (e.g., incorrect completion, missing input). In some embodiments, an error rate can be normalized by a total number of inputs in a particular field. Metrics associated with the performance of a campaign can include, for example, a content performance (e.g., ad performance, conversion rate, number of impressions/exposures).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some implementations, the machine-learned models can be deployed on-device. For example, one or more components of a predictive machine-learned model or pipeline can be deployed on-device to avoid the upload of potentially sensitive information relating to the types of input, the types of device(s), or the contents of the inputs (e.g., relating to disabilities, contact information, address, etc.) to a server. For example, the server computing system can send a form with a learned context vector describing one or more input fields associated with a fillable form. An onboard client model associated with the user computing device 102 can input local client characteristics (e.g., obtained via the user input component 122) and a context vector to generate an optimized notification element. This on device processing can increase data privacy for a user. In some embodiments, this can also reduce the amount of data transmitted off-device, thereby reducing bandwidth usage.

Example Model Arrangements

Figure 2:
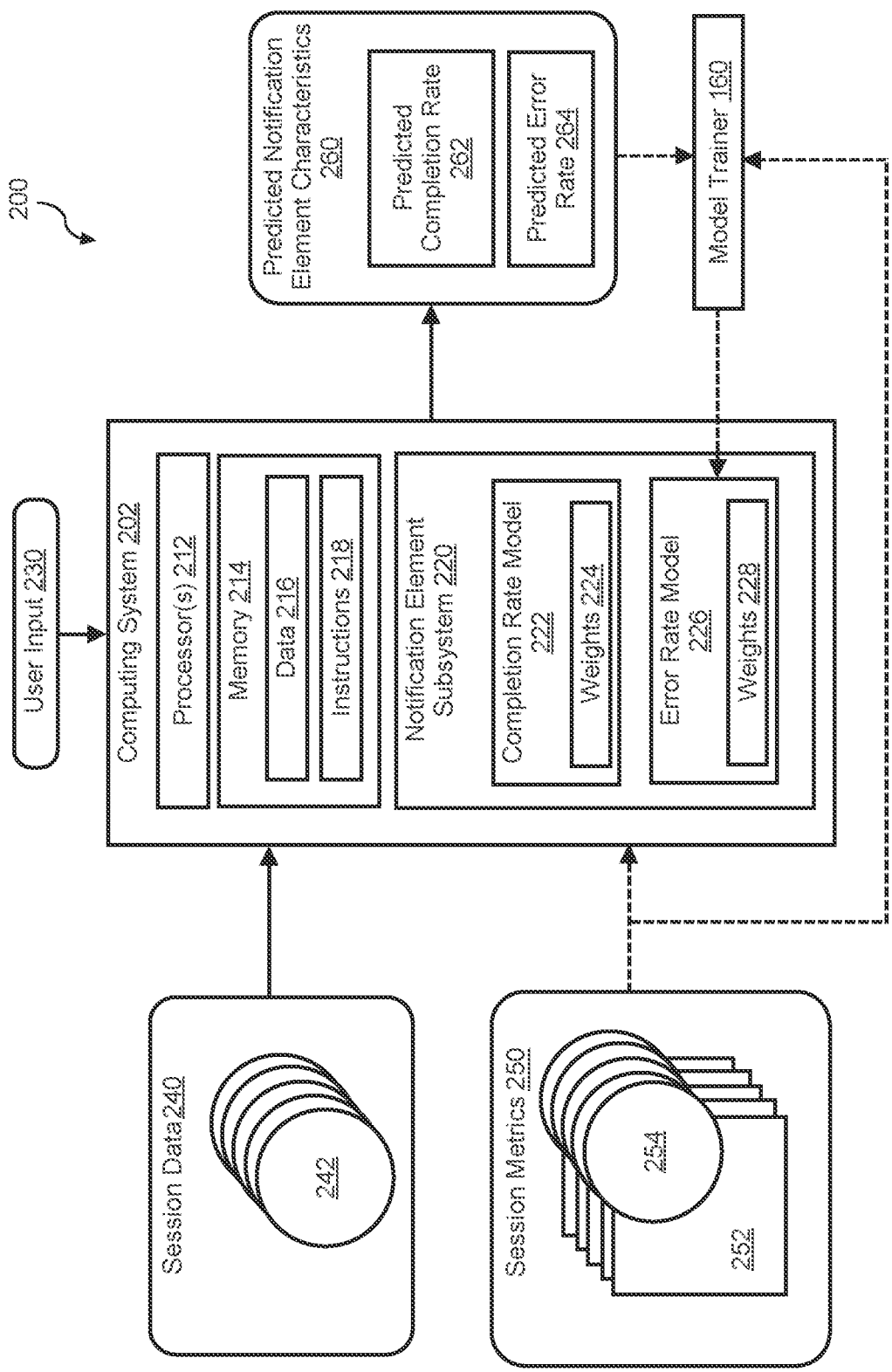
FIG. 2 depicts a block diagram associated with a machine-learned model(s) according to aspects of the present disclosure.

FIG. 2 depicts one example system 200 for updating or adapting a structured input interface according to example aspects of the present disclosure. The example system 200 contains a computing system 202. The computing system 202 can be any type of system of one or more computing devices (e.g., user computing device 102, server computing system 130, etc.). A computing device can be, for example, a personal computing device (e.g., laptop or desktop), a mobile computing device (e.g., smartphone or tablet), a gaming console or controller, a wearable computing device, an embedded computing device, a server computing device, a node of a distributed computing device, a virtual instance hosted on a shared server, or any other type of computing device. In some embodiments, the computing system 202 includes a plurality of computing devices interconnected via a network or otherwise distributed in an interoperable manner. For example, the computing system 202 can include a server for serving content over a network (e.g., network 180). For instance, the computing system 202 can include a web server for hosting web content, for collecting data regarding web content (e.g., for receiving, monitoring, generating, or otherwise processing data regarding web content, such as the use, download of, and/or interaction with web content).

The computing system 202 can contain processor(s) 212 and memory 214. The one or more processors 212 can be any suitable processing device (e.g., a processor core, a microprocessor, an ASIC, an FPGA, a controller, a microcontroller, etc.) and can be one processor or a plurality of processors that are operatively connected. The memory 214 can include one or more computer-readable storage media which may be non-transitory, such as RAM, ROM, EEPROM, EPROM, flash memory devices, magnetic disks, etc., and combinations thereof. The memory 214 can store data 216 and instructions 218 which are executed by the processor 212 to cause the computing system 202 to perform operations.

In some implementations, the client computing system 202 can store or otherwise implement one or more machine-learned models of a machine-learned model framework. In some embodiments, the notification element subsystem 220 comprises a two-model machine-learned model framework. The machine-learned model framework can include a machine-learned completion rate model 222 (e.g., with learnable weights 224), a machine-learned error rate model 226 (e.g., with learnable weights 228). In some embodiments, the notification element subsystem 220 can implement a single model that implements completion rate prediction, error rate prediction, or both (e.g., by combining one or more aspects of the completion rate model 224 and the error rate model 226, by training a single model to obtain the desired outputs directly, etc.). One or more of the machine-learned models can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

Embodiments of the example system 200 may be configured, as shown in FIG. 2, to process a user input 230) and session data 240 in view of session metrics 250 (e.g., performance metrics 252, context data 254). Responsive to processing the user input 230) and session data 240), the computing system 202 can output predicted notification element characteristics 260. In some embodiments, updated notification element characteristics 260 can include a predicted completion rate 262 and a predicted error rate 264. Based on the predicted notification element characteristics, the system can determine whether to update the notification element characteristics to increase completion rate and decrease error rate. For example, the updated notification element characteristics can include a state (e.g., active or inactive). The machine learned models can be trained using historical user data indicative of prior notification elements associated with input fields optimizing for completion rate and/or error rate.

In some embodiments, the user input 230) and user session data 240) are entered into an input interface of the computing system 202. For example, in some embodiments, the notification element subsystem 220 can be configured to process user inputs 230 and session data 240) as input to the computing system 202. In some embodiments, the user input 230 and session data 240) can be implicit in the structure and/or configuration of the notification element subsystem 220. For example, the notification element subsystem 220 can be configured to generate updated notification elements in response to user input and contextual data based on a predicted error rate and/or completion rate associated with updated notification elements. For example, the notification element subsystem 220 can be configured to generate updated notification element characteristics 260 for corresponding input fields subsequent and related to session metrics 250.

In some implementations, the notification element machine-learned model is trained to receive a set of input data (e.g., data indicative of user input 230) descriptive of user input data and, in response, provide output data (e.g., predicted notification element characteristics 260) indicative of one or more notification element characteristics to be rendered in association with one or more respective input fields. For instance, FIG. 2 illustrates the machine-learned model performing inference along the solid lines, with an example training flow illustrated along the dashed lines.

In some implementations, the input data can include one or more features that are associated with an instance or an example. In some implementations, the one or more features associated with the instance or example can be organized into a feature vector. In some implementations the output data can include one or more predictions. Predictions can also be referred to as inferences. Thus, given features associated with a particular instance, the machine-learned model can output a prediction for such instance based on the features.

The machine-learned model can be or include one or more of various different types of machine-learned models. In particular, in some implementations, the machine-learned model can perform classification, regression, clustering, anomaly detection, recommendation generation, and/or other tasks.

In some implementations, the session data 240 includes session activity events 242. Session activity events can be associated with one or more user sessions. Session activity events 242 can include context data associated with a current user. User sessions can include user sessions associated with one or more of a plurality of users. The user sessions can be associated with a first user that is associated with the user input 230. For example, the user input 230 can be obtained on the same user device as the session activity events 242. In some examples, the user input 230 can be obtained on a different user device than the session activity events 242.

Additionally, or alternatively, the user sessions can be associated with a plurality of users that are different from the first user that is associated with the user input 230. Thus, in some examples, the session activity events can be associated with aggregate user session data from a plurality of user sessions. In some embodiments the session activity events can occur on the same user device as the user input 230. In addition, or alternatively, the session activity events can occur on different devices than the user input 230.

In some embodiments, the session data 240 includes unlabeled session activity events 242. Unlabeled session activity events 242 can include instances of substantially any kind or type of data that may be descriptive of various phenomena. In general, an instance refers to a set of one or more data values grouped together to describe a particular subject or subject matter. For example, an instance can be a feature vector. An instance can be associated with a measurement or other data collection event (e.g., at a particular time, or of a particular subject, or using a particular device, or from a particular perspective, etc.). In some examples, an instance of an unlabeled source activity event can be indicative of a communication from a source entity (e.g., a message in a content item).

An instance can be associated with a network session, such as a set of interactions with a web server. In some embodiments, an instance can be associated with a user's interaction with web content (e.g., campaign construction flow). In some embodiments, the unlabeled session activity events 242 might contain no label information for the instances. In some embodiments, the unlabeled session activity events 242 may contain some label information but may lack other label information.

For example, in some embodiments, session activity events 242 can contain data descriptive of a content creation platform and/or a content item on the platform that facilitated the event. Session activity events 242 can contain data descriptive of users and their role in the event, such as how long the user interacted with the platform and/or content item, what actions were taken by the user on the platform (e.g., whether input fields were entered, whether the input is correct), characteristics of the user (e.g., account size, campaign history, prior campaign success), etc.

In some embodiments, the notification element subsystem 220 can be configured to generate predicted notification element characteristics 260 (e.g., updated notification elements) for corresponding input fields subsequent and related to session metrics 250.

In some implementations, session metrics 250 can include performance metrics 252 and context data 254 (e.g., associated with various user(s)). In some examples, performance metrics 252 can be associated with context data 254. For example, completion activity events can include a completion of a workflow in a prior user session (e.g., multiple input fields within a single user session), completion of a specific input field, a completion rate associated with a specific user identifier, an aggregate completion rate (e.g., from a plurality of users associated with a similar construction flow). In some examples, performance metrics 252 can be associated with context data 254. For instance, context data can be data indicative of session activity events (e.g., session activity events 242 during a prior user session). Performance metrics 252 can be associated with particular features of the context data 254. For example, performance metrics can include a completion rate and/or error rate. Each context data 254 can have an associated completion rate data that can be input to all models of the notification element subsystem 220 (e.g., both the completion rate model 222 and the error rate model 226). In some examples, one or more elements of completion rate data is input only into the completion model 222. Additionally, or alternatively, error rate data can include an error rate of a workflow (e.g., multiple input fields within a single user session), an error rate associated with a user identifier (e.g., a single user), an error rate associated with a device type, an aggregate error rate (e.g., associated with a plurality of users). In some examples, the error rate data can be input to all models of the notification element subsystem 220 (e.g., both the completion rate model 222 and the error rate model 226). In some examples, one or more elements of error rate data is input only into the error rate model 226.

In some embodiments, the session activity events 242 can be anonymized or otherwise obfuscated in the session activity 240. For example, session activity 240 can be reported to the computing system 202 in the aggregate (e.g., as a collection of aggregated events). In some embodiments session activity events 242 can be stored on a user device thus increasing data privacy for the user. The user device can receive a data structure which can interact with the session activity events 242. Session activity events 242 can include context data associated with a current user.

In some embodiments, performance metrics 252 and/or context data 254 (e.g., associated with various user(s)) can include instances of substantially any kind or type of data that may be descriptive of various phenomena. In general, an instance refers to a set of one or more data values grouped together to describe a particular subject or subject matter. For example, an instance can be a feature vector. An instance can be associated with image data (e.g., a feature vector for an image, a hashed image, etc.). An instance can be associated with a measurement or other data collection event (e.g., at a particular time, or of a particular subject, or using a particular device, or from a particular perspective, etc.). An instance can be associated with a network session, such as a set of interactions with a web server. In some embodiments, an instance can be associated with a user's interaction with web content (e.g., anonymous or identified). In some examples, an instance of a session metric 250) can be indicative of a completion rate above a desired threshold and/or an error rate below a desired threshold associated with a notification element characteristic (e.g., inactive state, active state). Accordingly, in some embodiments, determining session metrics 250) related to session data 240) can include estimating completion rate and error rate associated with input fields in a structured user interface associated with a content generator.

Predicted notification element characteristics 260 can include or be based on, for example, predicted completion rate 262 and predicted error rate 264. Predicted completion rate 262 can include a set of target activity (e.g., a count of correct completions and/or input field completions). In this manner, for example, one or more user input 230) and session data 240) can be executed over the session metrics 250 for obtaining data associated with completion rate above a threshold.

Predicted error rate 264 can include a rate of performance metrics (e.g., performance metrics 254) that have an error rate below a threshold. The session metrics 250) can include a list of previous notification elements of associated input fields. In some embodiments, the predicted error rate 264 can include a breakdown of error rates based on input field characteristics (e.g., type of input field, category of input field). Thus the session metrics 250 can include pairing performance metrics 252 with specific context data events 254. The error rate can be a calculated error rate based on historical data and/or a predicted error rate based on current session data. Session data can contain data descriptive of users and their role in the event, such as how long the user interacted with the platform and/or content item, what actions were taken by the user on the platform (e.g., whether input fields were entered, whether the input is correct), characteristics of the user (e.g., account size, campaign history, prior campaign success), the day or time, whether the user device has an account associated with the platform provider.

In some embodiments, the completion rate model 222 outputs predicted target activity (e.g., a number of completions above a threshold), the error rate model 226 outputs target error rate (e.g., a number of errors below a threshold), and both outputs can be used for determining an updated notification element for one or more input fields in a structured user interface. For example, the system can determine that a particular notification element state has previously performed well in prior user sessions. This can be determined based in part on historical data including prior notification elements rendered with respective input fields in a fillable form, prior completion rates, and prior error rates. For the current session, for example, based on user data (e.g., historical user data and/or current user session data), the system can predict a completion rate and/or error rate. Based on the predicted completion rate and/or error rate the system can determine whether to keep the notification elements in a current state and/or update the notification element(s).

For example, in some embodiments, the predicted error rate 264 relates the predicted completion rate 262 to a plurality of input fields. For example, the predicted error rate 264 can include a data structure containing entries for a plurality of input fields and entries for predicted completion rate 262 that the notification element subsystem 220 has associated with respective input fields of the plurality of input fields. For example, historical user data can include data indicative of a user incorrectly completing a form. This can be incorrect completion of a certain number of fields and/or some other measurement of a portion of fields above a threshold error rate for the form. Based at least in part on the error rate for the form, the system can determine to render notification elements which explicitly instruct a user to complete particular fields (and/or how to complete the fields). In some implementations, the notification element can be updated to a notification element associated with a lower error rate for a plurality of users (e.g., other than the current user associated with the current user session). Increasing completion rate and decreasing error rate helps to reduce the computational processing and bandwidth usage by decreasing transmission of error notifications, transmission of incomplete input data structures, and futile processing of incomplete inputs.

In some embodiments, the notification element subsystem 220 can be trained using reinforcement learning. For example, a training dataset comprising historical user input, completion rates, and error rates can be used to train the notification element subsystem. In response to obtaining user data, the system can determine updated notification element characteristics that optimize completion rates and error rates. The system can learn appropriate weights based on receiving a reward for predicted notification elements that increase completion rate and/or decrease error rate. In some implementations, the notification element subsystem 220 can be a machine-learned model. The session metrics 250 and predicted notification elements can be used by a model trainer 160 to train the notification element subsystem 220.

The trained model can be used to predict completion rates and error rates which can in turn be used to determine the best notification element characteristics (e.g., inactive state, active state, active state comprising a suggestion). In some embodiments, a simulated user model can be trained using the training data to generate simulated inputs according to patterns learned from the training data. The simulated user model can, in some instances, provide a simulated environment in which the reinforcement learning agent, the notification element subsystem, can be trained.

Figure 3:
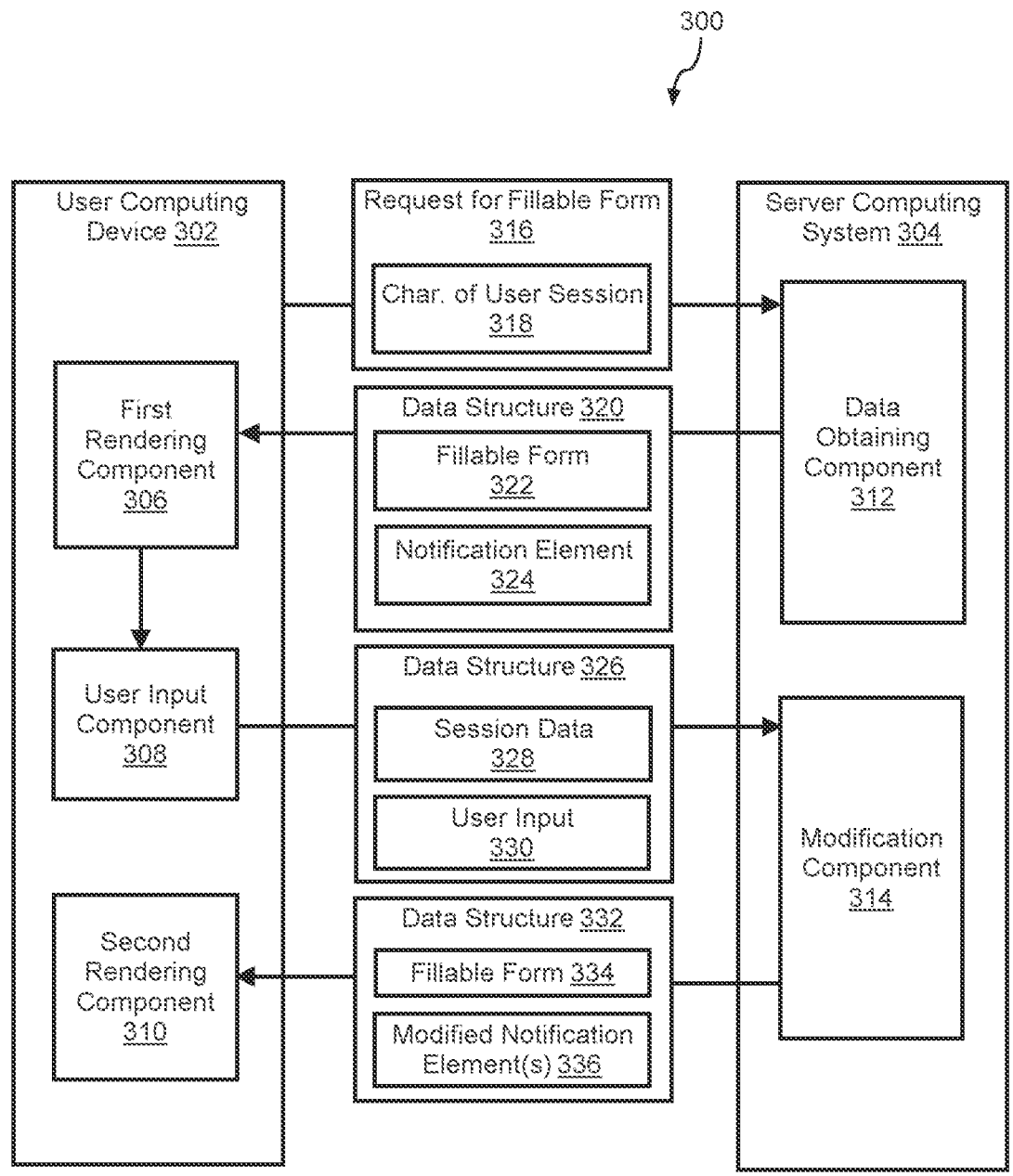
FIG. 3 depicts an example data structure flow according to example embodiments of the present disclosure.

FIG. 3 depicts a block diagram of an example system 300 for transmitting data from a current user session to update notification elements in response to user session data. Example system 300 can include a user device 302 (e.g., user computing device 102) and a server computing system 304 (e.g., server computing system 130). The user computing device 302 can include a first rendering component 306, a user input component 308, and a second rendering component 310. The server computing system 304 can include a data obtaining component 312 and a modification component 314. The user computing device 302 and server computing system 304 can communicate over a network (e.g., network 180).

In some embodiments the user computing device 302 can send a request for a fillable form 316 to the server computing system 304. The request for fillable form 316 can include characteristics of the user session 318. For example, the request can include a user input associated with a particular website for creating a content item campaign. The request for a fillable form can be a request for a content item creation workflow. The characteristics of the user session 318 can include user account data, user input indicative of selection of a particular workflow (e.g., to create a content item, to create an advertisement, etc.), one or more characteristics of the user computing device 302, etc.

The request for a fillable form 316 can be received by the data obtaining component 312 of the server computing system 312. The data obtaining component 312 can determine one or more characteristics of the user session (e.g., characteristics of the user session 318). The server computing system 303 can generate, obtain, or otherwise provide a data structure 320. The data structure 320 can include fillable form data 322 and notification element 324. For instance, in some embodiments the notification element can be determined by a notification element subsystem 220 according to example aspects of the present disclosure. The data structure 320 can be sent to the user computing device 302. For example, the fillable form data 322 can include instructions that are executable to cause a fillable form to be rendered on a user interface. The fillable form can include a plurality of user input fields that can have associated notification elements. The notification elements can have characteristics (e.g., indicative of a state of the notification element). In some implementations, the notification element 324 can be initial notification element.

The first rendering component 306 of the user computing device 302 can cause the data structure to be rendered via a user interface of the user computing device 302. For example, the user interface of the user computing device can be a graphical user interface, an audio interface, and/or a visual interface. For example, the user interface can include a graphical user interface. The fillable form comprising a plurality of input fields with associated notification element(s) 324 can be displayed on the user device. By way of example, the fillable form can be associated with a construction flow for creating a content item. The content item can be a search result. For example, in some embodiments, the construction flow can include an interface like the interface in FIG. 5A. The interface can include a plurality of input fields (e.g., title, URL, heading) and associated notification elements (e.g., labels stating the field is "required"). Thus, an initial fillable form can be rendered on user computing device 302.

The user computing device 302 can obtain user input via an interface. The user input can be obtained by the user input component 308 of the user computing device 302. For example, user input can include input touch, speech, and/or physical gestures. The system can obtain data signals indicative of user interaction with the interface indicative of user input. The user input can be processed and packaged (e.g., in data structure 326) to be communicated to server computing system 304. Additionally, or alternatively, the user computing device 302 can generate data structure 326. Data structure 326 can include session data 328 and user input data 330. The data structure 326 can be sent by the user computing device 302 to the server computing system 304. The server computing system 304 can receive data structure 326. For example, the modification component 314 of the server computing system 304 can receive data structure 326. For example, the server computing system 304 can modify one or more notification elements based on the session data 328 and/or user input 330. For example, the first rendering of fillable form 322 can contain notification elements that indicate an active notification element state and historical data indicates that an inactive state and/or suggestion state would provide an increased predicted completion rate and/or decreased predicted error rate. In response, the modification component 314 could process the input and determine that the notification elements should be modified. The modification component 314 can generate one or more modified notification element(s) 336 and a fillable form 334.

The modified notification element(s) 336 and fillable form 334 can be sent as data structure 332 to the user computing device 302. The fillable form 334 can be the same form as fillable form 322. For example, the system can determine that the initial notification element performs as well and/or better than a potential updated notification element. Additionally, or alternatively, the fillable form 334 can be a different and/or modified form compared to fillable form 322. For example, the modification component 314 can determine an updated notification element (e.g., modified notification element 336). The modification component 314 can include one or more machine-learned models (e.g., machine-learned models 120, 140). The machine-learned models can be trained and/or used to predict completion rates and error rates. For example, the system can input the user data into the notification element machine-learned model(s) (e.g., notification element machine-learned model(s) 220). In some implementations, the machine-learned model can be trained using historical user input data. In some implementations machine-learned model(s) can include a generative language model. For example, the generative language model can be used to generate suggestions for notification elements.

In some embodiments, the user data can be input into the notification element machine-learned model(s) (e.g., notification element machine-learned model(s) 220). In some implementations, the machine-learned model can be trained using historical user input data. In some implementations machine-learned model(s) can include a generative language model. For example, the generative language model can be used to generate suggestions for notification elements. The system can receive notification element characteristics as output from the notification element machine-learned model. In determining the output of the model, the model can consider various factors for weighting, including historical user data The user computing device 302 can obtain data structure 332. Upon receipt of data structure 332, the second rendering component 310 can cause the modified fillable form (e.g., fillable form 334) and modified notification elements (e.g., modified notification elements 336) to be rendered. The rendering can occur via a user interface. For example, the user interface can include a graphical user interface, audio interface, etc. For example, the updated user interface can be an interface as depicted in FIG. 5B. The system can provide an updated structured input interface comprising the notification elements based on the notification element characteristics Following the rendering of the modified fillable form 334 and/or modified notification element(s) 336, user input can be obtained. The system can determine a completion rate and/or error rate for the associated user session. This user session data can be stored on device and data indicative of user session can be stored as historical user data. The historical user data can be used to train machine-learned models.

Although FIG. 3 illustrates a modified notification element 336 being provided after a notification element 324 is provided, it is to be understood that the notification element 324 can be modified for provision to the user computing device 302 based on an initial determination by the server computing system 304 (e.g., based on context of the user session, etc.) according to example aspects of the present disclosure.

Example Methods

Figure 4:
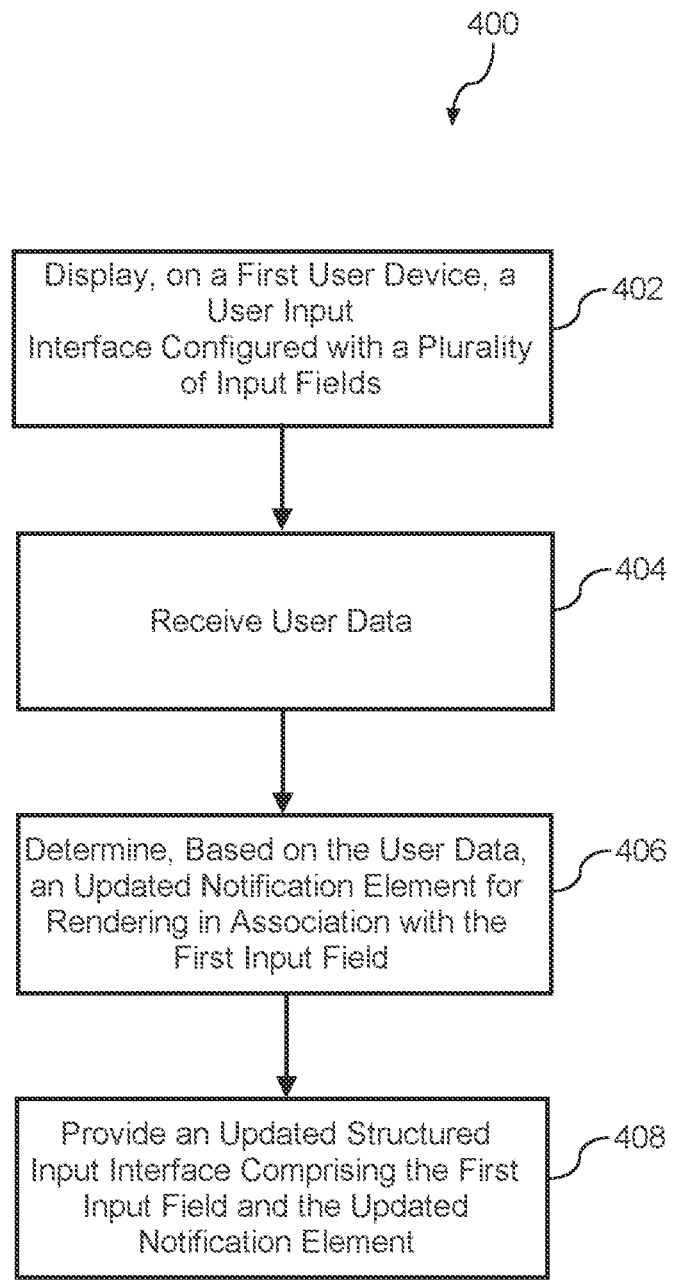
FIG. 4 depicts a flowchart of an example method according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At (402), a computing system can display, on a first user device, a user input interface configured with a plurality of input fields. As described herein the method can include providing, to a first user device, an input interface configured with a plurality of input fields. By way of example, the structured input interface is configured for rendering in a graphical user interface. A first input field corresponds to an initial notification element in the graphical user interface for rendering in association with the first input field.

At (404), the computing system can receive user data. As described herein the method can include receiving from the first user device, user data. By way of example the user data can include at least one of (i) input data indicative of a user input into at least one of the plurality of input fields, (ii) user account data, or (iii) device identifier data. For example, user account data can be indicative of at least one of (i) an account age, (ii) a content strategy type, (iii) a user size, or (iv) one or more content strategy performance metrics associated with one or more prior content strategies. For example, a user can be a company and/or organization. A user size can be indicative of a company size (e.g., number of employees, size relative to the market, annual revenue). Content Strategy performance metrics can be indicative of the success of a prior content strategy. This can be defined numerous ways, including conversion rate, sign-ups for a service, purchases, downloads, clicks, etc.

At (406), the computing system can determine, based on the user data, an updated notification element for rendering in association with the first input field. As described herein the method can include determining, based on the user data, an updated notification element for rendering in association with the first input field. By way of example the updated notification element can correspond to at least one of an active state of a notification or an inactive state of a notification. The active state of notification can include a message indicative of at least one of (i) input for the first input field being required or (ii) a suggestion for input for the first input field. The inactive state of the notification can include at least one of (i) no notification or (ii) a message indicative of fulfillment of the first input field not being required.

In some implementations, the system can determine the updated notification element based on one or more metrics comprising at least one of (i) a threshold count of fulfilled inputs, or (ii) an input error rate. In some examples, the input error rate can be associated with a first user identifier corresponding to the first user device. Additionally, or alternatively, the input error rate can be associated with a type of interface device. The threshold count of fulfilled inputs can, for example, be illustrative of an input completion rate. By way of example, the system can determine that a threshold count of fulfilled inputs has been exceeded. In response, the system can determine to update a notification element from an active state to an inactive state (or vice versa).

In some embodiments, the updated notification element can be determined using a machine-learned model. For example, the system can generate, using a machine-learned model, one or more characteristics of the updated notification element. The machine-learned model can be trained on historical user data using an objective configured to optimize a completion rate of the first input field. Additionally, or alternatively the machine-learned model can be trained on historical data using an objective configured to optimize an input error rate of the first input field. In some implementations, the system can generate, using a machine-learned model, one or more characteristics of the updated notification element. The machine-learned model can be trained on historical user data using an objective configured to optimize an aggregate completion rate. By way of example, the aggregate completion rate can be determined based on at least a completion rate of the first input field and a completion rate of a second input field.

In some implementations, the one or more characteristics can include a suggestion phrase generated using a machine-learned model. For example, the machine-learned model can be trained on historical data indicative of prior notification elements, user sessions, input completion rates, and error rates. The machine-learned model can obtain data indicative of a current user session. Based on the obtained user session data, the model can generate a suggestion phrase. The system can provide the suggestion phrase to be displayed via the user interface as the notification element.

In some implementations the updated notification element can include a suggestion phrase obtained from a data repository. The data repository can include a plurality of suggestion phrases. For example, the plurality of suggestion phrases can be predetermined phrases that relate to particular input fields. In response to obtaining data associated with a user session, the system can select a suggestion phrase. The system can provide the suggestion phrase to be displayed via the user interface as the notification element.

At (408), the computing system can provide an updated structured input interface comprising the first input field and the updated notification element. As described herein the method can include providing an updated structured input interface comprising the first input field and the updated notification element. By way of example the structured input interface and the updated structured input interface can be provided to the first user device associated with a first user identifier. In addition, or alternatively, the structured input interface can be provided to the first user device and the updated structured input interface can be provided to a second user device. The first user device and the second user device can be associated with a first user identifier. The updated structured input interface helps to increase completion rate and decrease error rate to reduce the computational processing and bandwidth usage by decreasing transmission of error notifications, transmission of incomplete input data structures, and futile processing of incomplete inputs associated with the input interface.

Example User Interfaces

Figure 5A:
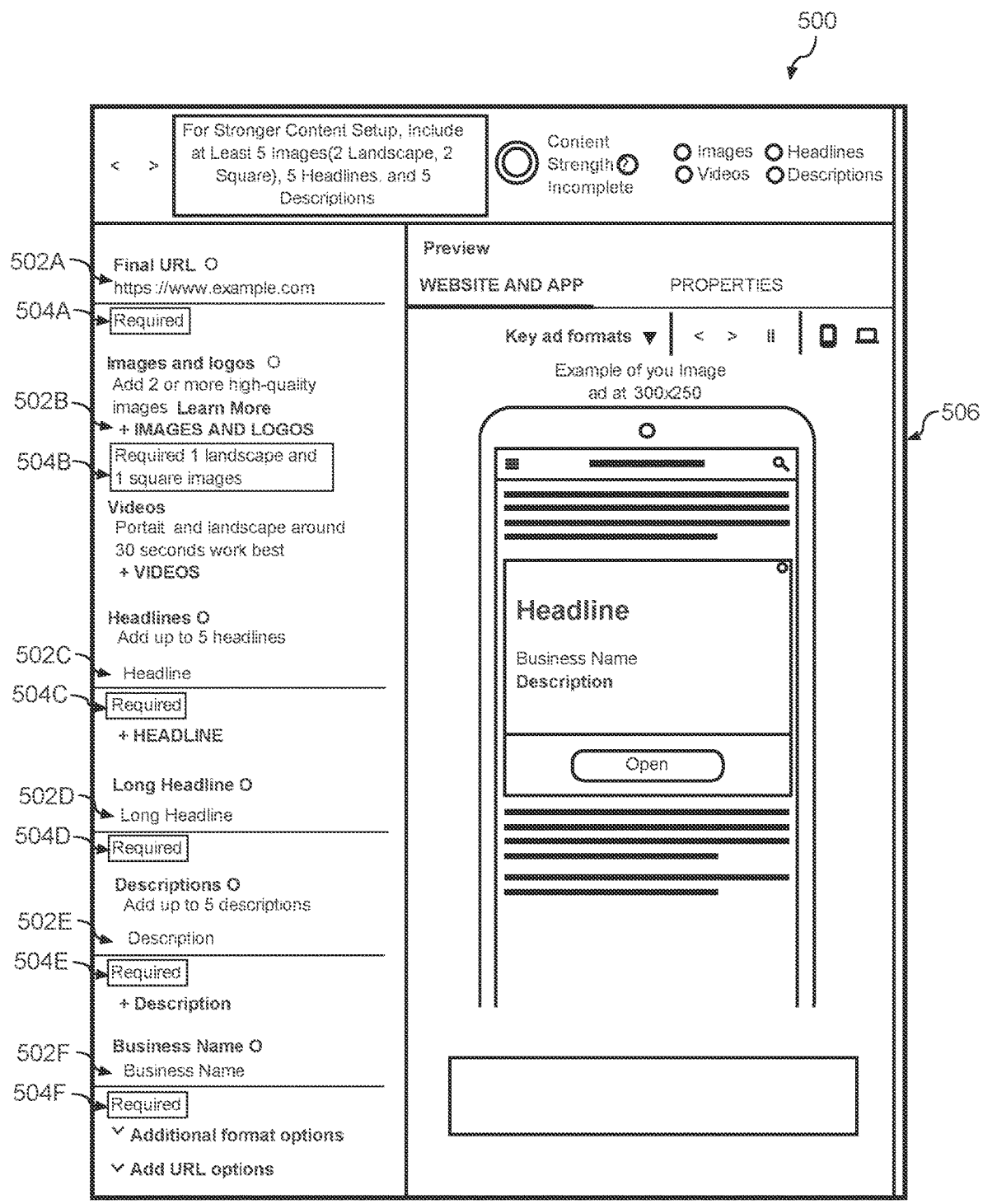
FIG. 5A depicts a user interface according to example embodiments of the present disclosure.
Figure 5B:
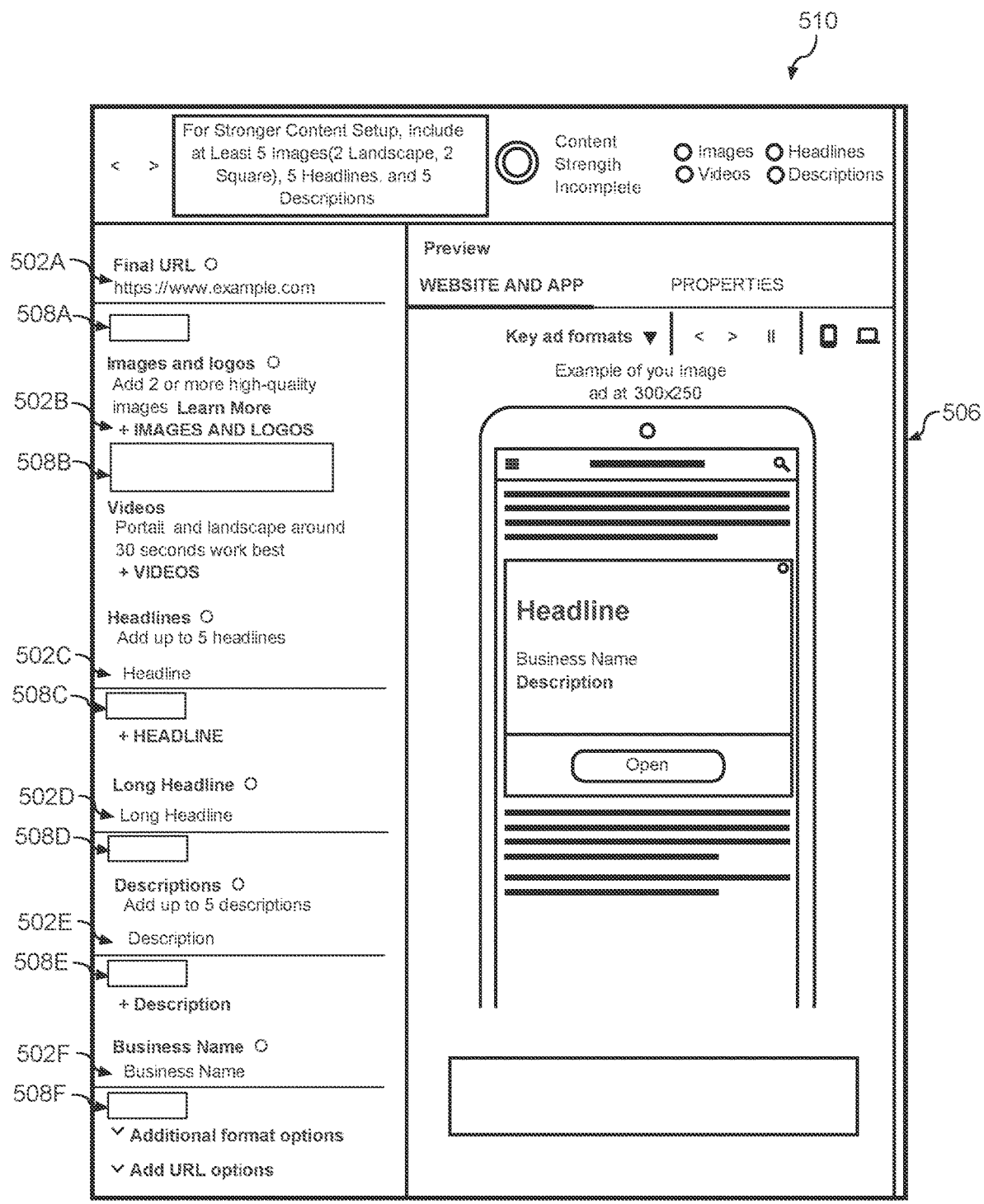
FIG. 5B depicts a user interface according to example embodiments of the present disclosure.
Figure 5C:
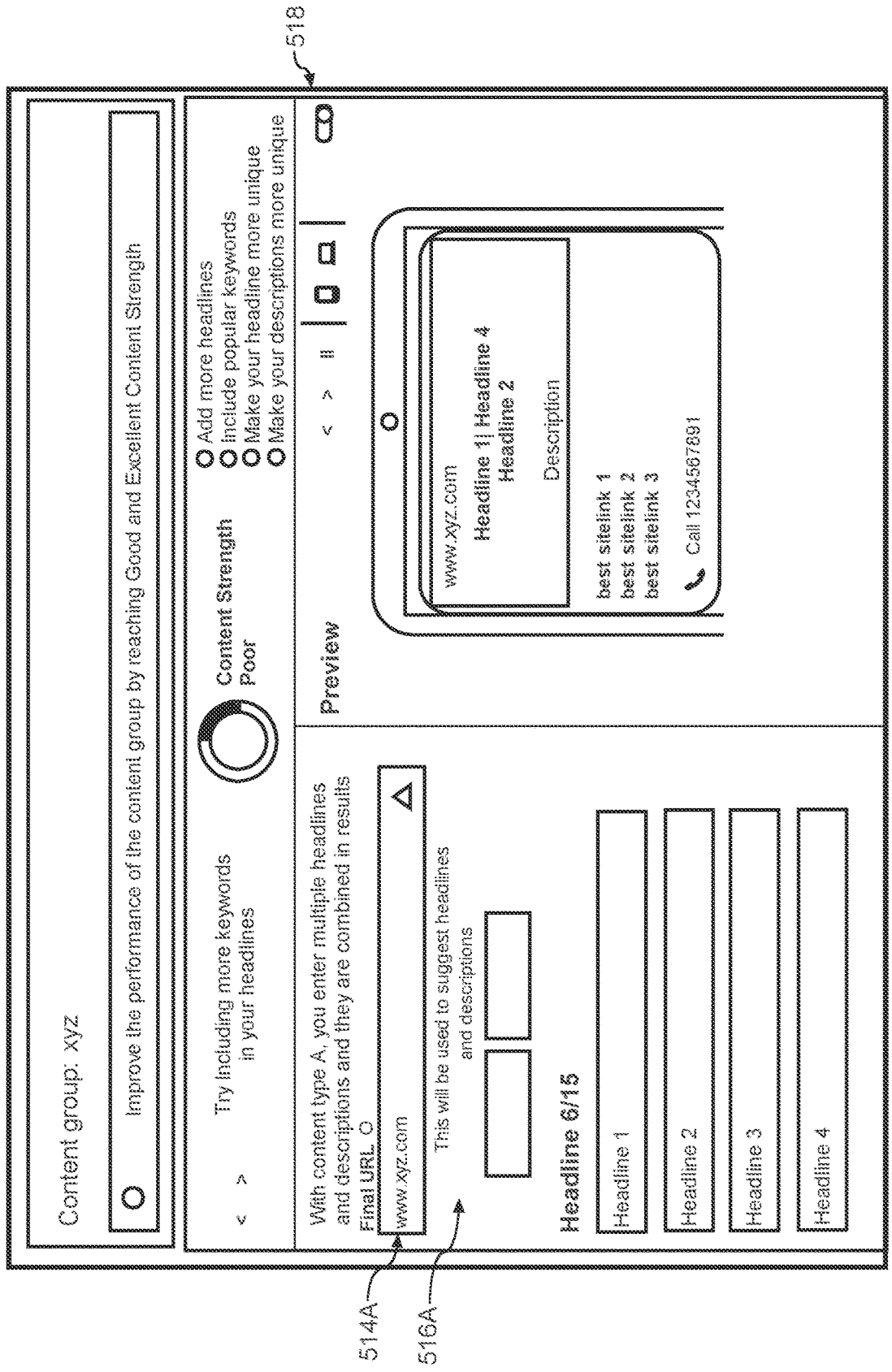
FIG. 5C depicts a user interface according to example embodiments of the present disclosure.

FIGS. 5A-5C depict example structured user interfaces according to example embodiments of the present disclosure. In some embodiments, the user interface 500 can comprise a plurality of input fields 502A-F and respective notification elements 504A-F. In some implementations, the user interface can include a preview of a content item 506.

In some implementations, input fields can be associated with various input data categories. For example, the content can be associated with a campaign. The campaign can be associated with a content item. The structured user interface includes various input fields configured to receive user input. For example, the input fields can include a URL Field 502A, one or more Image Fields 502B, a Headline Field 502C, a Long Headline Field 502D, a Description Field 502E, and/or a Business Name Field 502F.

In some embodiments the notification element can be in an active state. For example, as depicted in FIG. 5A, the active state of a notification element can include text indicative of a field being required. This can include text that reads "required." In some implementations, the "required" text can be in a different color from other text present within the structured user interface (e.g., red font color, grey font color).

In some implementations, the system can determine whether to update a structured user interface to comprises inactive state element notifications and/or active state element notifications. The active state of a notification element can include text indicative of a suggestion associated with one or more of the input fields. As shown in FIG. 5C, the suggestion can include text indicating contextual information associated with the input field. For example, contextual information can include at least one of (i) how the information input into the field will be used, (ii) hints and/or tips on best practices for filling in an input, or (iii) suggested inputs. The suggestion phrases can be predetermined text strings. In addition, or alternatively, the suggestion phrases can be determined by one or more machine-learned models. For example, an input field 514A can have an associated notification element 516A. In some implementations the notification element 516A can be in an active state. For example, the active state can be associated with a suggestion. The suggestion can include a message that includes how the input information will be used. This can be determined based on a machine-learned model (e.g., machine-learned model 200) which can be trained using historical information to optimize for at least one of error rate or completion rate. The user interface 512 can include a preview of the content item 518.

In some embodiments, the notification elements can be updated to an inactive state. For example, turning to FIG. 5B, an updated sample user interface can be generated comprising a plurality of input fields 502A-F and respective updated notification elements 508A-F.

The technology discussed herein makes references to multiple notification elements comprising the same state (e.g., inactive state or active state). However, it is foreseeable that a single notification element associated with a respective input field can be updated from an active state to an inactive state (or vice versa) while one or more alternative notification elements associated with respective input fields can remain in a constant state (e.g., remain in an inactive state, remain in an active state). For example, as depicted in FIG. 5B, the system can determine that a user has had successful completions of the same form for previous campaigns. In response to determining that the same user is creating a campaign of the same campaign type and prior successful completions of the user being above a threshold of successful completions, the system can determine to update notification element (e.g., notification element 508A-F) from an active state of required to an inactive state (e.g., with no notification element) or an alternative active state (e.g., a suggestion state). The system can generate an updated structured input interface 510 comprising the plurality of input fields 502A-F and one or more updated notification elements 508A-F.

ADDITIONAL DISCLOSURE

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A system for updating a structured input interface, comprising:
   one or more processors; and
   one or more computer-readable media storing instructions that are executable to cause the one or more processors to perform operations, the operations comprising:
      displaying, on a first user device, a structured input interface configured with a plurality of input fields, wherein the structured input interface is configured for rendering in a graphical user interface, and a first input field corresponds to an initial notification element in the graphical user interface for rendering in association with the first input field;
      receiving, from the first user device, user data;
      determining, based on the user data, an updated notification element for rendering in association with the first input field; and
      updating the structured input interface comprising the first input field and the updated notification element, wherein the updated structured input interface is provided to a second user device, wherein the first user device and second user device are associated with a first user identifier.

2. The system of claim 1, wherein the user data comprises at least one of (i) input data indicative of a user input into at least one of the plurality of input fields, (ii) user account data, or (iii) device identifier data.

3. The system of claim 2, wherein the user account data is indicative of at least one of (i) an account age, (ii) a content strategy type, (iii) a user size, or (iv) one or more content strategy performance metrics associated with one or more prior content strategies.

4. The system of claim 1, wherein the updated notification element corresponds to at least one of an active state of a notification or an inactive state of the notification.

5. The system of claim 4, wherein the active state of the notification comprises a message indicative of at least one of (i) input for the first input field being required or (ii) a suggestion for input for the first input field.

6. The system of claim 4, wherein the inactive state of the notification comprises at least one of: (i) no notification or (ii) a message indicative of fulfillment of the first input field not being required.

7. The system of claim 1, wherein the structured input interface and the updated structured input interface are provided to the first user device associated with a first user identifier.

8. The system of claim 1, wherein determining the updated notification element is based on one or more metrics comprising at least one of: (i) a threshold count of fulfilled inputs, or (ii) an input error rate.

9. The system of claim 8, wherein the one or more metrics comprise the input error rate, wherein the input error rate is associated with a first user identifier corresponding to the first user device.

10. The system of claim 8, wherein the one or more metrics comprise the input error rate, wherein the input error rate is associated with a type of interface device.

11. The system of claim 1, wherein determining, based on the user data, the updated notification element comprises: generating, using a machine-learned model, one or more characteristics of the updated notification element, wherein the machine-learned model was trained on historical user data using an objective configured to optimize a completion rate of the first input field.

12. The system of claim 1, wherein determining, based on the user data, the updated notification element comprises: generating, using a machine-learned model, one or more characteristics of the updated notification element, wherein the machine-learned model was trained on historical user data using an objective configured to optimize an aggregate completion rate.

13. The system of claim 12, wherein the aggregate completion rate is determined based on at least a completion rate of the first input field and a completion rate of a second input field.

14. A computer-implemented method comprising:
displaying, on a first user device, a structured input interface configured with a plurality of input fields, wherein the structured input interface is configured for rendering in a graphical user interface, and a first input field corresponds to an initial notification element in the graphical user interface for rendering in association with the first input field;
receiving user data;
determining, based on the user data, an updated notification element for rendering in association with the first input field; and
providing an updated structured input interface comprising the first input field and the updated notification element, wherein the updated structured input interface is provided to a second user device, wherein the first user device and second user device are associated with a first user identifier.

15. The computer-implemented method of claim 14, wherein determining the updated notification element comprises: generating, using a machine-learned model, one or more characteristics of the updated notification element.

16. The computer-implemented method of claim 15, wherein the machine-learned model was trained on historical data using an objective configured to optimize an error rate of the first input field.

17. The computer-implemented method of claim 15, wherein the one or more characteristics comprises a suggestion phrase generated using the machine-learned model.

18. The computer-implemented method of claim 14, wherein the updated notification element comprises a suggestion phrase obtained from a data repository comprising a plurality of suggestion phrases.

19. A non-transitory computer readable medium embodied in a computer-readable storage device and comprising instructions that, when executed by a processors, cause the processor to perform operations, the operations comprising:
displaying, on a first user device, a structured input interface configured with a plurality of input fields, wherein the structured input interface is configured for rendering in a graphical user interface, and a first input field corresponds to an initial notification element in the graphical user interface for rendering in association with the first input field;
receiving user data;
determining, based on the user data, an updated notification element for rendering in association with the first input field; and
providing an updated structured input interface comprising the first input field and the updated notification element, wherein the updated structured input interface is provided to a second user device, wherein the first user device and second user device are associated with a first user identifier.

* * * * *